United States Patent
Fahringer, Sr.

[11] Patent Number: 6,138,976
[45] Date of Patent: Oct. 31, 2000

[54] FISHING POLE HOLDER

[76] Inventor: Stephen A. Fahringer, Sr., 3750 Trogon Way, Las Vegas, Nev. 89013

[21] Appl. No.: 08/913,753
[22] PCT Filed: Mar. 22, 1996
[86] PCT No.: PCT/US96/03779
  § 371 Date: Sep. 22, 1997
  § 102(e) Date: Sep. 22, 1997
[87] PCT Pub. No.: WO96/28991
  PCT Pub. Date: Sep. 26, 1996

Related U.S. Application Data

[63] Continuation-in-part of application No. 08/409,263, Mar. 22, 1995, abandoned.

[51] Int. Cl.$^7$ .................................................. A47F 7/00
[52] U.S. Cl. ..................... 248/518; 211/70.8; 224/219; 224/222; 224/922; 248/205.2; 248/534
[58] Field of Search ..................... 248/518, 534, 248/535, 539, 205.2, 230.8, 316.7, 74.2; 224/219, 222, 242, 247, 922; 211/70.8

[56] References Cited

U.S. PATENT DOCUMENTS

| 1,761,497 | 6/1930 | Smith | 248/539 |
| 1,786,254 | 12/1930 | Meehan | 248/534 |
| 2,165,625 | 7/1939 | Fessel | 224/219 |
| 2,456,445 | 12/1948 | Rees et al. | 224/247 X |
| 3,160,158 | 12/1964 | Rayhart | 224/222 X |
| 3,282,482 | 11/1966 | Scharsu | 224/922 X |
| 3,550,824 | 12/1970 | Bohanski | 224/247 X |
| 4,733,808 | 3/1988 | Turner, Jr. et al. | 224/219 |
| 4,896,465 | 1/1990 | Rhodes et al. | 224/219 X |
| 5,123,578 | 6/1992 | Morse | 224/151 |

*Primary Examiner*—Derek J. Berger

[57] ABSTRACT

A fishing pole holder includes a first pole clip (10), a second pole clip (44) and two straps (36, 58). The first pole clip (10) carries the receiving portion of a snap (32). The second pole clip (44) is D-shaped and carries two female snap members (54, 55). The first strap (36) carries a snap portion (42) for attachment to the first pole clip (10) and the second strap (58) carries two snap portions (64, 65) for attachment to the second pole clip (44). The first strap (36) is wrapped about a fisherman's forearm or wrist and the second strap (58) about the person's leg or ankle. The butt, handle end (70) of a fishing pole (72) may be placed in the second pole clip (44) and, fairly near the pole tip, the pole (72) is pushed into the first pole clip (10). Thus, both hands can be used for tasks other than holding the pole (72), e.g., changing lures or baiting.

7 Claims, 5 Drawing Sheets

FISHING POLE HOLDER

This is a continuation-in-part of U.S. patent application Ser. No. 08/409,263, filed Mar. 22, 1995 now abandoned.

TECHNICAL FIELD

The present invention relates broadly to supports. More particularly, it relates to a support for holding a fishing pole so the person using the pole may have both hands free to perform other tasks.

BACKGROUND OF THE INVENTION

While fishing using a fishing pole and line, it is frequently necessary to use both hands for attaching lures, hooks, leaders and other equipment to the line. Other activities requiring both hands are baiting, cleaning fouled hooks and removing fish. Freeing both hands means that the person has to let go of the pole or rod, running the risk of losing it or fouling the reel or line. Letting go of a rod may be particularly difficult or undesirable when fly fishing or fishing from a boat or canoe.

As reflected by the following noted patents, fishing pole holders to facilitate using and handling fishing poles are known.

U.S. Pat. No. 4,759,963 (Uso, Jr. et al.) discloses a fishing pole fastening device with an elasticized band for placing about a railing and a second band permanently attached crosswise to the elasticized band for fastening to a fishing pole. Both bands have a "Velcro" fastening mechanism so they can be formed into loops. While the device disclosed by Uso, Jr. et al. could be placed about a limb of a person, if it were placed on the arm or wrist of a fisherman, the free ends of the second band or the loop formed thereby could interfere with casting or get tangled with the fishing line, clothing or other equipment. Additionally, if one attempted to use the Uso, Jr. et al. device on the lower leg, it would be difficult to quickly and conveniently insert or simply drop the butt end of a fishing pole into the soft, flexible loop formed by the second band. The Uso, Jr. et al. pole capturing band is permanently attached to the elasticized band and the entire device must be detached from the railing to which it is attached to move it or a pole to another location.

U.S. Pat. No. 1,761,497 (Smith), U.S. Pat. No. 1,786,254 (Meehan), U.S. Pat. No. 2,846,129 (O'Brien) and U. S. Pat. No. 4,739,914 (Pothetes) disclose fishing rod holders of the type using rigid or semi-rigid jaws (Pothetes), spring-like clamps (O'Brien and Meehan) or clasps (Smith) to hold the butt or base portion of a fishing rod. The rod holding mechanisms of these devices cannot be separated easily from the base portion secured to the user. None provides for capturing and holding a fishing pole near the tip of the pole.

U.S. Pat. No. 3,874,573 (Fruscella et al.), U.S. Pat. No. 4,569,466 (Webber), U.S. Pat. No. 5,024,018 (Ferrigno), U. S. Pat. No. 5,123,578 (Morse) and U.S. Pat. No. 5,386,932 (Gross) disclose holster type fishing rod holders designed to be secured to the belt of a fisherman. None discloses a feature for holding the tip of a fishing rod or a rod holding member which can be easily detached from the belt engaging portion to be mounted on something else, for example a railing or the gunwale of a fishing boat.

Accordingly, there is a need for a holder for holding a fishing pole, wherein the holder is adapted to securely hold a pole at or adjacent to the butt and/or the tip, either to a person's body or to another object, so the person using the pole may have both hands free for performing tasks such as changing lures, baiting or the like.

SUMMARY OF THE INVENTION

The needs outlined above are in large measure met by the fishing pole holder of the present invention, which comprises four separate and substantially interchangeable elements: two pole clips and two straps. More specifically, the pole holder of the present invention includes a first, upper pole clip having a base carrying a receiving or female snap member of a snap arrangement. Two shoulders are resiliently movably connected to the base and, with the base, define a pole receiving and holding space. A pole entry notch is provided at the gap between the shoulders to facilitate moving the pole into the receiving space. The second, generally D-shaped lower pole ring clip has a generally rectangular base carrying two female snap members. An arcuate, continuous band-like portion is connected at its ends to the ends of the base. Together the band-like portion and the base define a pole-receiving space larger than that associated with the first clip.

The straps of the present invention include a first strap and a second strap relatively longer than the first strap. Both straps have "Velcro" or complimentary hook and loop type strap connectors adjacent their ends so the ends of each strap may be secured to each other to form each strap into a continuous, closed loop. The first, shorter strap is preferably made of nylon web, has a "Velcro" or hook and loop type connector for forming it into a loop and carries a single male snap member midway along its length. The longer strap is preferably made of neoprene, has a connector comprising a socket and a projection releasably received in the socket and carries two male snap members, both at about and equally spaced from the middle of the strap length.

In use, the first, shorter strap is intended primarily to be wrapped about a fisherman's forearm or wrist and the longer strap about the person's leg or ankle. The male snap members on both straps are facing outwardly when the straps are wrapped about a person's limb or another object. The upper pole clip is snapped onto the single male snap member carried by the shorter strap and, similarly, the lower pole clip is snapped onto the two snap members carried by the longer strap. The butt or handle end of a fishing pole may be placed in the D-shaped lower pole clip and, fairly near the pole tip, the pole may be snapped into the upper pole clip. Thus held by the present invention, the pole can be released by both hands. Since the butt of the pole is captured in the lower pole clip, since the upper, first pole clip spins 360° (around the center of the snap arrangement attaching it to the first strap), and since the pole is flexible, particularly near the tip, a user can bend, sit, walk or otherwise move about and use both hands for other tasks, e.g., netting and removing caught fish, changing lures, baiting, etc.

It is an object of the present invention to provide a fishing pole holding device for holding a fishing pole securely and conveniently while both of the user's hands are free. Advantageously, when one of the straps, with a clip connected to it, is placed about the wrist or forearm of the user and the more flexible portion of a fishing pole (i.e., the portion of the pole near the tip) is inserted in the clip, since the snap arrangement connecting the clip to the strap permits the clip to turn and the pole bends the user may easily move to remove fish, change lures or perform other line-end tasks.

Another object of the present invention is to provide a fishing pole holder which is convenient and easy to use, even when it is being used in a boat or when the user's hands are wet.

Another object of the present invention is to provide a fishing pole holder including a therapeutic aspect, particularly for persons subject to the motion sickness known as seasickness. As is well known, for many years people have believed that acupuncture, an originally Chinese practice of puncturing the body with needles at specific points, cures disease and relieves pain or other physical conditions. Acupuncture without the needles is known as acupressure. It is somewhat akin to therapeutic massage and involves exerting pressure inwardly against the body at specific locations, again to cure or relieve physical conditions. Acupressurists and their subjects believe that exerting pressure against the wrist in the general region of the pulse relieves the symptoms of motion sickness. The object of providing a therapeutic fishing pole holder is accomplished by providing, in one embodiment of the present invention, an acupressure stimulator, i.e., means for causing or exerting pressure against the body at a specific location, associated with at least one of the straps, particularly the upper or wrist strap. The pressure exerted is continuous as along as the strap is worn, and may be increased or decreased by tightening or loosening the strap.

Yet another object of the present invention is to provide a pole holder which is advantageous for use in fly fishing, frequently done from rocky or marshy shores of rivers and creeks where it may be difficult, if not impossible, for the fisherman to put down the fly rod to change flies. With the D-shaped lower clip in place on the lower leg, a fisherman may simply place the butt of the rod into the clip to avoid setting it in water or mud. The rod also may be captured and held in the upper clip at a location spaced from the butt of the rod while changing flies.

The large, unobstructed opening of the D-shaped second pole clip is advantageous because the central opening can receive a pole or rod end first in any orientation, i.e., it is not necessary to spin the pole about its longitudinal axis to a particular orientation before dropping or inserting it into the clip.

Still another object of the present invention is to provide a fishing pole holder wherein the elements or components of the holder are substantially interchangeable and may be used in various combinations. For example, the shorter strap and first, upper pole clip may be used without the longer strap and D-shaped clip or vice versa. The two clips may be used without the straps, either together or separately, by attaching one or both to the male snap members commonly found on the gunwales of boats. One of the straps may be wrapped about a thwart or pier railing and one or the other of clips snapped to the strap.

Other objects, features and advantages of the present invention will become more fully apparent and understood with reference to the following specification and to the appended drawings and claims.

DETAILED DESCRIPTION OF THE PREFERRED EMBODIMENT

In this detailed description, unless specifically described as otherwise, means for fastening, mounting, attaching or connecting the components of the present invention to form the fishing pole holder as a whole are intended to encompass conventional fasteners such as friction fit snaps, machine screws, hook and eye arrangements, rivets, nuts and bolts, toggles, pins, or the like. Other fastening or attachment means appropriate for connecting components include complimentary hook and loop type connectors, socket/prong connectors, buckles, adhesives and welding, including sonic welding. The term fishing pole is intended to encompass all types of fishing rods and poles including fly rods, casting rods, ice fishing rods, cane poles, deepsea and sport fishing rigs, surf casting rods and the like. Generally, unless specifically otherwise disclosed or taught, the materials from which the various components of the present invention, for example the clips and straps, are selected from appropriate materials including plastics or the like and neoprene, nylon, other synthetics or the like, respectively.

Figure 1:
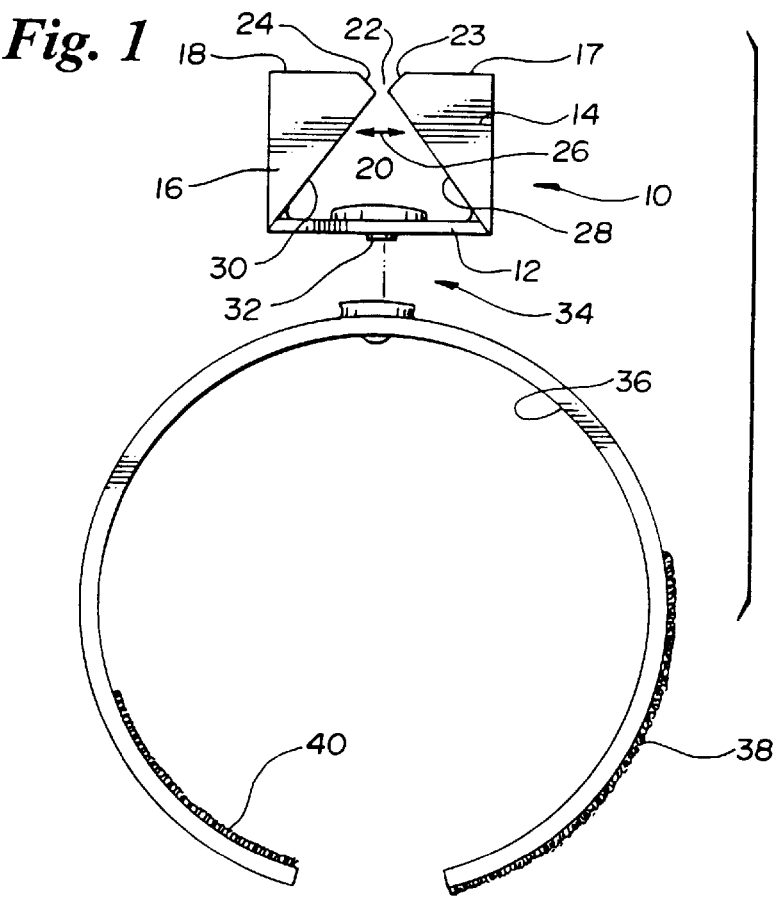
FIG. 1 is an elevational view of a first clip and strap combination of the fishing pole holder of the present invention.

Referring then to the drawings, as depicted in FIG. 1, the fishing rod holder of the present invention includes a first, upper fishing pole receiving clip 10 having a generally rectangular, thin, flat base 12 with two pairs of opposed parallel edges. The first clip 10 includes two outstanding shoulders 14, 16. The shoulders 14, 16 are removably and resiliently connected to the base 12 at two of the opposed edges of the base 12. The shoulders stand generally perpendicularly and outwardly away from one side of the base 12 and each has a free end 17, 18. Together the base 12 and the two shoulders 14, 16 define a fishing pole receiving space 20. The free ends 17, 18 of the shoulders 14, 16 provide a central pole receiving notch 22 to facilitate the spreading of the shoulders 14, 16 away from each other along arrow 26 to facilitate the insertion of a pole into the space 20. The notch 22 is formed by angled shoulder walls 23, 24. The angled inside walls 28, 30 of the shoulders 14, 16 ease the removal of the pole from the space 20. With continued reference to FIG. 1, the projecting portion of one part 32 (denoted a female or receiving member) of a snap arrangement (the snap arrangement is indicated generally at 34) is carried on the base 12 for coupling the first clip 10 to the first strap 36.

Figure 2:
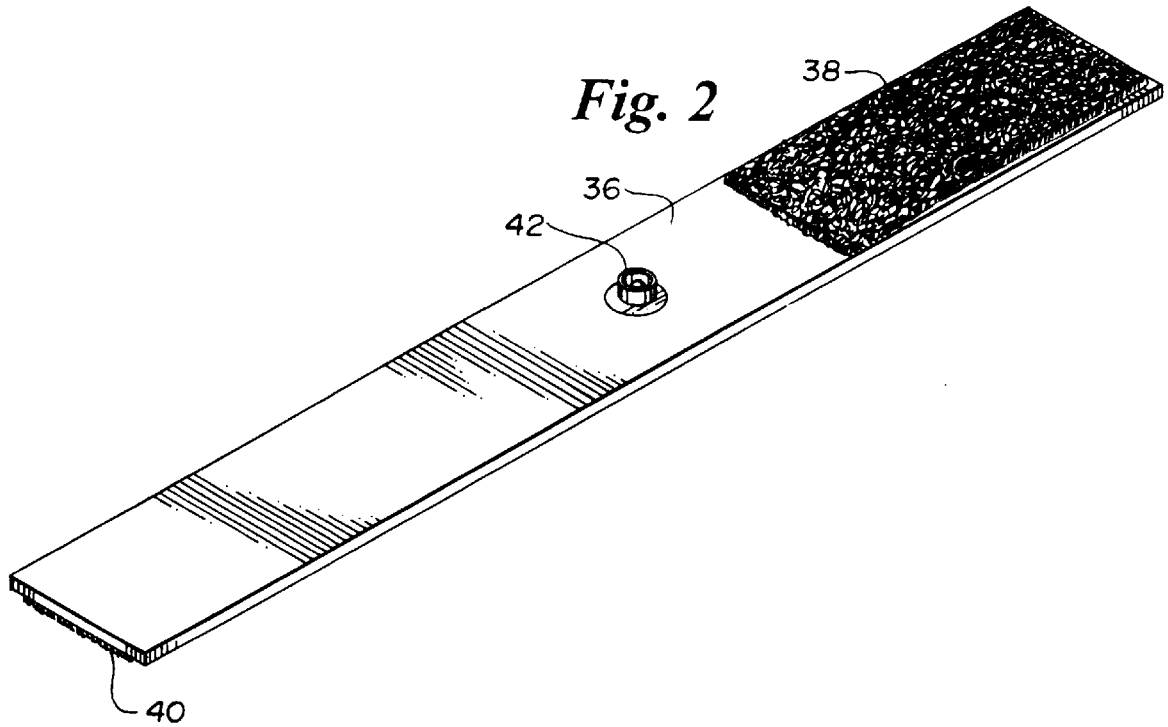
FIG. 2 depicts the first strap.

Referring to FIGS. 1 and 2, the first strap 36 of the present invention is a generally rectangular length of synthetic web or woven material such as nylon. Adjacent to each end, but on opposite sides, the strap 36 carries complementary hook and loop fabric, the loop portion indicated at 38 and the hook portion indicated at 40. The hook and loop connective material is used to join the strap ends together to form a continuously closed loop as suggested in FIG. 1. Although "Velcro" or like hook and loop connective material is preferred, other releasable connective materials, such as low tack adhesive, may be used. The loop is adjustable in size because the strap ends, and thus the hook and loop fabric, may be overlapped and connected at any point along the length of the hook and loop fabric, as long as a secure connection is formed. At about midway along the length of the strap 36, it carries a male member 42 of the strap arrangement 34.

Figure 3:
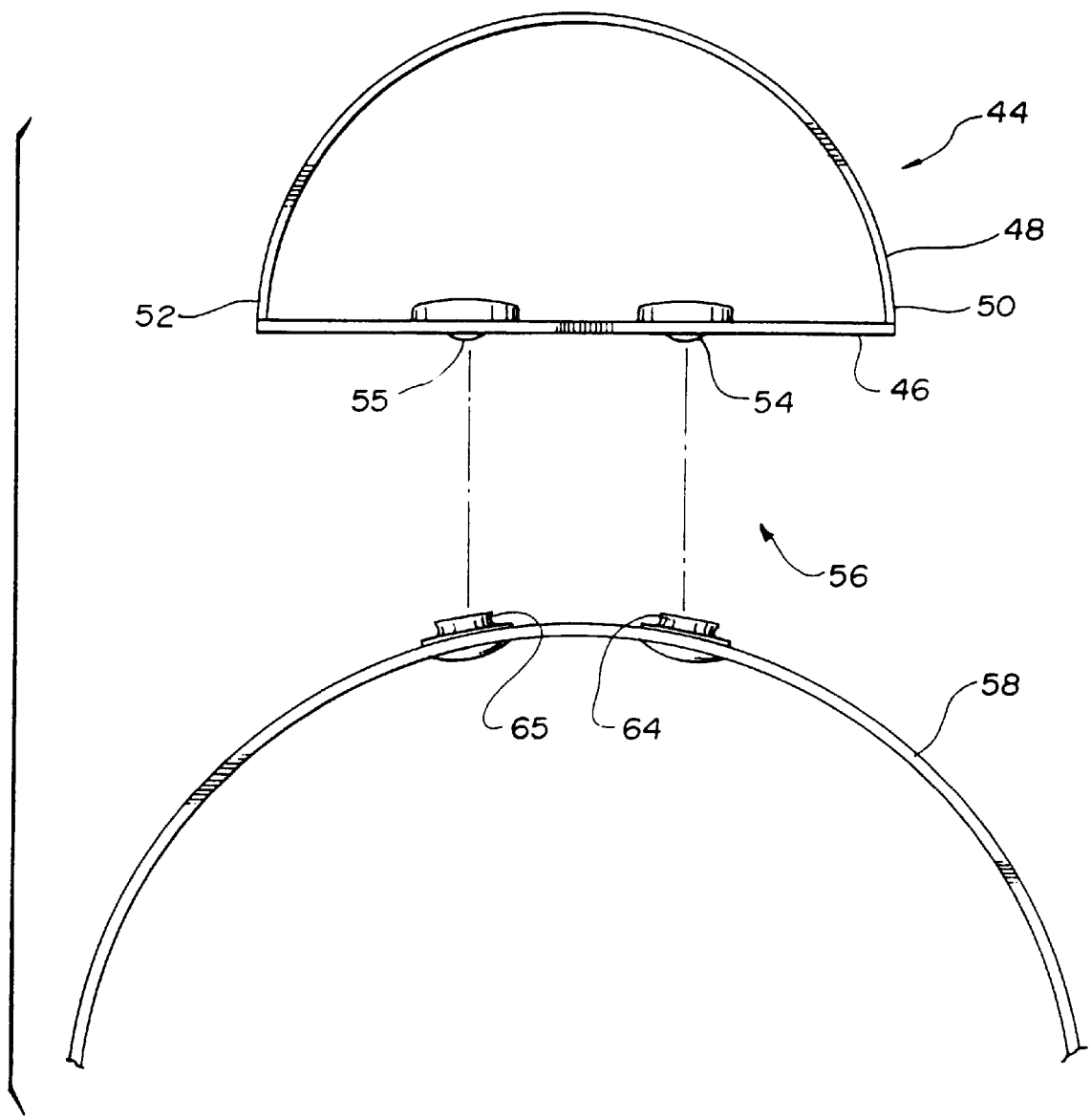
FIG. 3 an elevational view depicting a second clip and strap combination of the present invention.
Figure 4:
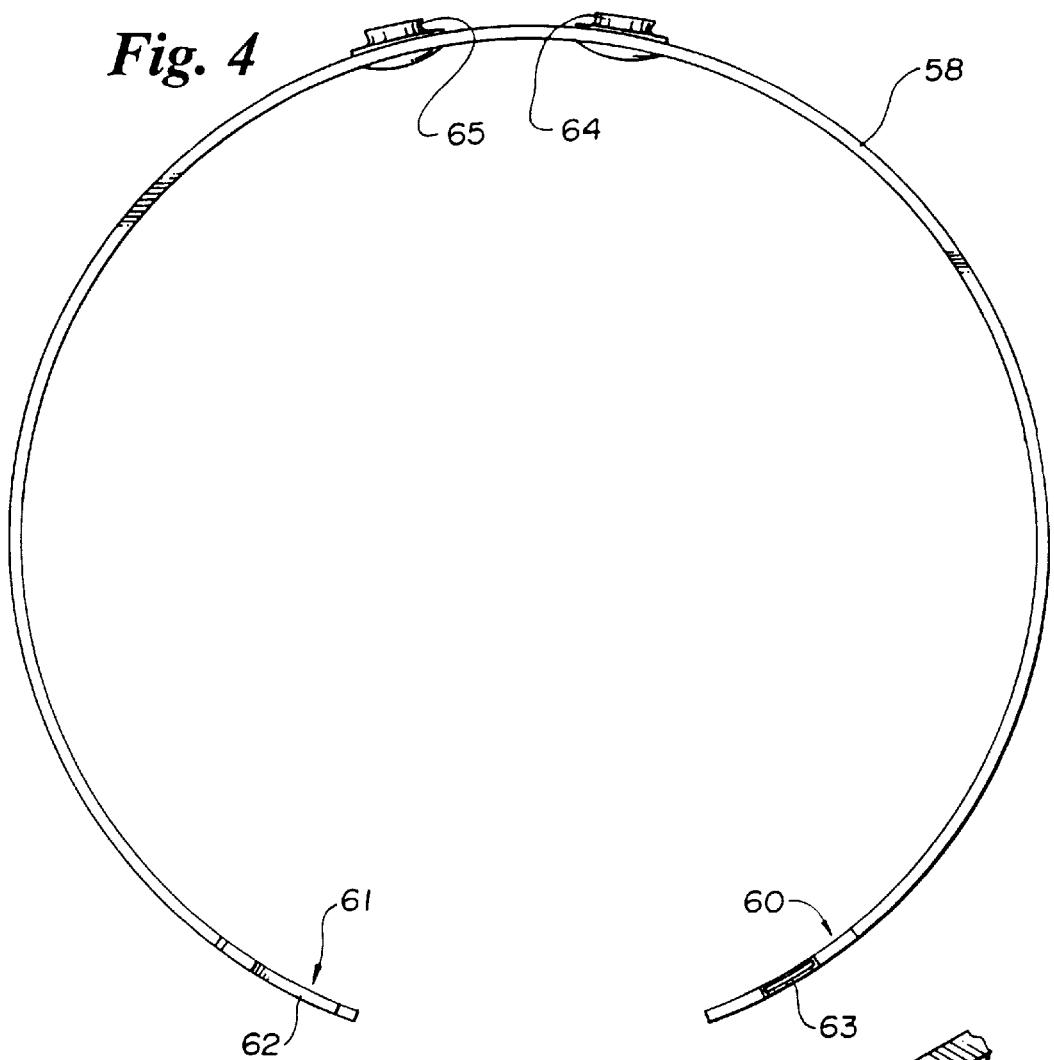
FIG. 4 the second strap.

Referring to FIGS. 3 and 4, the fishing pole holder of the present invention includes a second, lower fishing pole receiving clip 44. The second clip 44, which is generally D-shaped, includes a rectangular, thin, flat base 46 having two pairs of opposed parallel edges. A continuous arcuate portion 48 having two ends 50, 52 is connected to the base 46 at two of the opposed end edges thereof. The base 46 of the second clip 44 carries two snap receiving or female members 54, 55 of the snap arrangement 56 for connecting the second clip 44 to the second strap member 58 of the present invention.

Figure 4A:
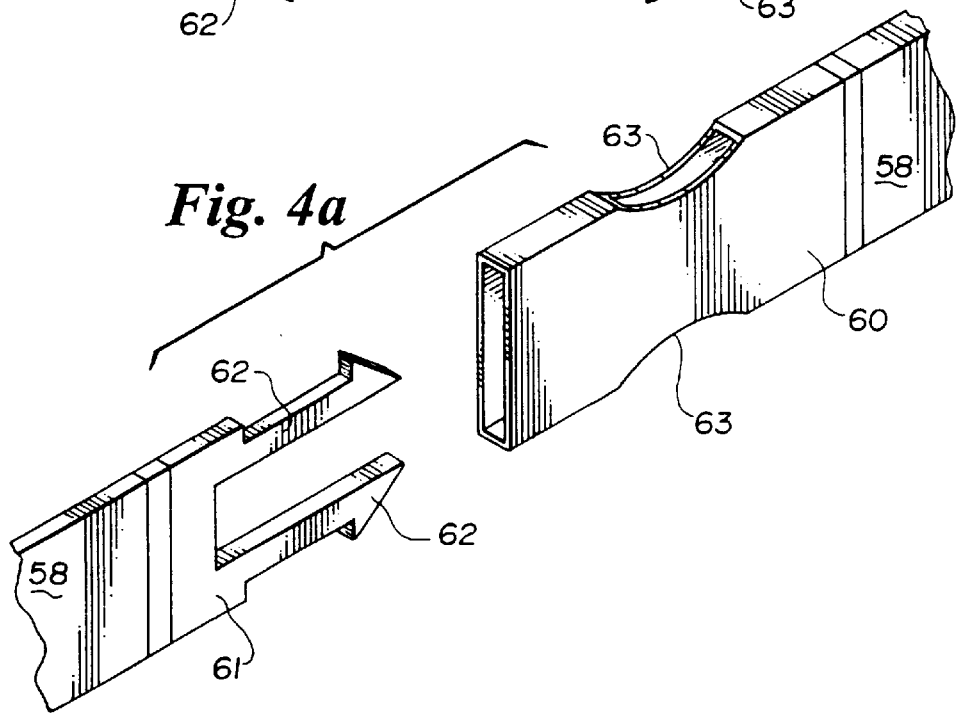
FIG. 4a depicts the preferred end connector, including a projection and a projection receiving socket, for connecting the ends of the second strap.

Like the first strap member 36, the second strap member 58 is a continuous length of flexible material, neoprene being preferred. The second strap 58 has two free ends. Referring to FIGS. 4 and 4a, at each end, the second strap member carries a complementary connecting means comprising a socket 60 and a double prong projection for being received in the socket 60. The two prongs 62 are resiliently movably connected to the solid projection base and when received in the socket 60 may be squeezed toward each other at the finger insets 63 to release them from the socket 60. About midway along the length of the strap 58, the second strap carries two spaced male or projecting snap members 64, 65 for being received in the complementary female members 54, 55 carried by the second clip 44.

Figure 5:
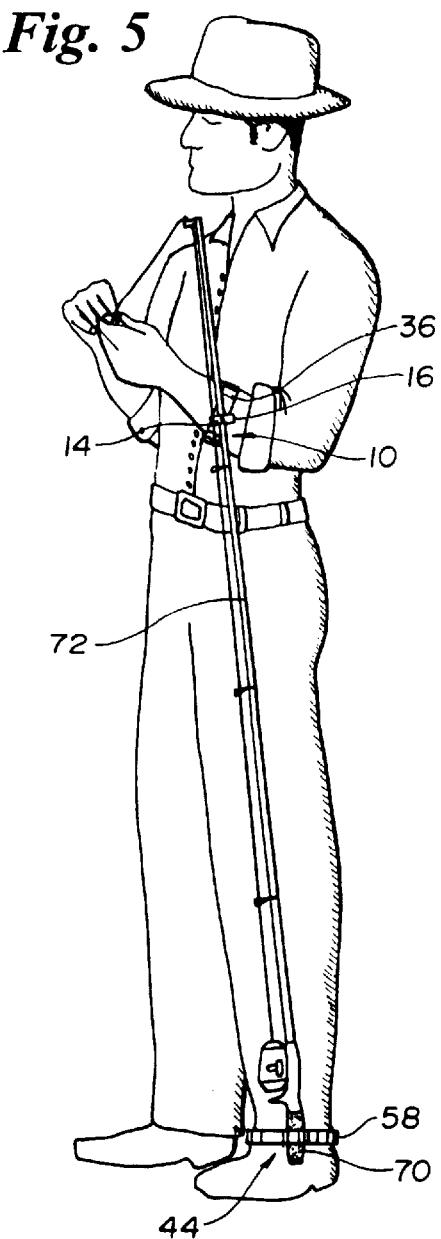
FIG. 5 depicts the present invention in use by a fisherman.
Figure 6:
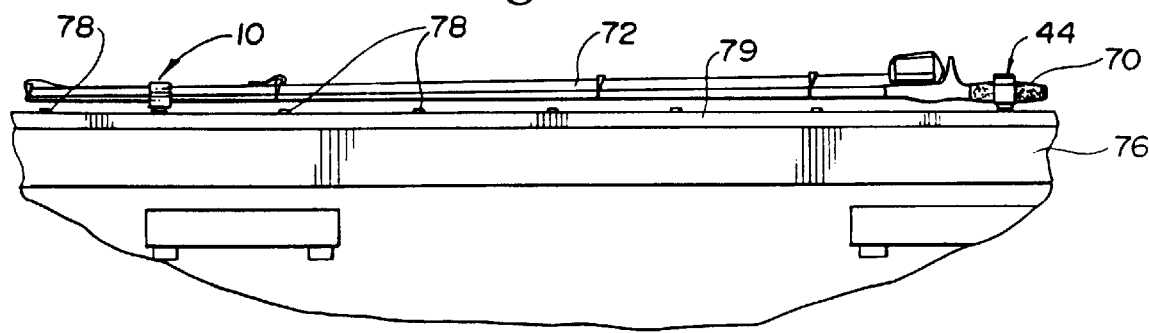
FIG. 6 depicts the present invention in use holding a fishing rod on the gunwale of a boat.

FIGS. 5 and 6 depict the pole holder of the present invention in use. FIG. 5 shows the preferred mode of use wherein the first strap 36 is placed about the wrist or forearm of the user with the first upper clip 10 snapped onto the strap 36, and the second strap 58 is placed about the ankle or lower leg with the lower clip 44 attached to it. (The first clip and second clips 10, 44 are described as upper and lower, respectively, because of their positional relationship when in use as depicted in FIG. 5, but the designation of upper and lower is for convenience and they obviously can be used in other positional relationships.) The fisherman depicted in FIG. 5 has placed the butt 70 of the pole 72 in the lower clip 44 and inserted the upper region of the pole 72 between the shoulders 14, 16 of the first clip 10. Thus held by the present invention, the pole can be released by both hands. Since the butt 70 of the pole 72 is captured in the lower pole clip 44 and the first clip 10 can spin about the center axis of the snap arrangement, a user can bend, sit, walk or otherwise move about and use both hands for other tasks, e.g., netting and removing caught fish, changing lures, baiting, etc. This ease of movement is enhanced because the pole 72 is flexible, particularly near the tip. When the task is done, the tip region of the pole 72 is removed from the upper clip 10, the pole 72 is lifted from the lower clip 44 and fishing may be resumed.

The elements of the present invention may be used interchangeably. For example, either strap 36, 58 may be wrapped around a railing of a fishing boat or pier (not shown) and used with either the clip 10, 44. As shown in FIG. 6, on many boats, represented at 76 (particularly commercial fishing boats, such as those known as "day or half-day" boats), either or both of the clips 10, 44 may be used without the straps 36, 58, i.e., male snap members 78 are commonly found along boat gunwales 79 and/or at the bow and stern. In this mode of use, as shown, the rod 72, with a baited line, is generally parallel to the gunwale 79. Of course, using the larger D-shaped, lower clip 44 alone, the rod 72 could be placed at an angle to the gunwale 79 Either way, this disposition of a rod 72 would be useful for trolling or for holding a fishing pole 72 securely out of the way for transportation.

Figure 7:
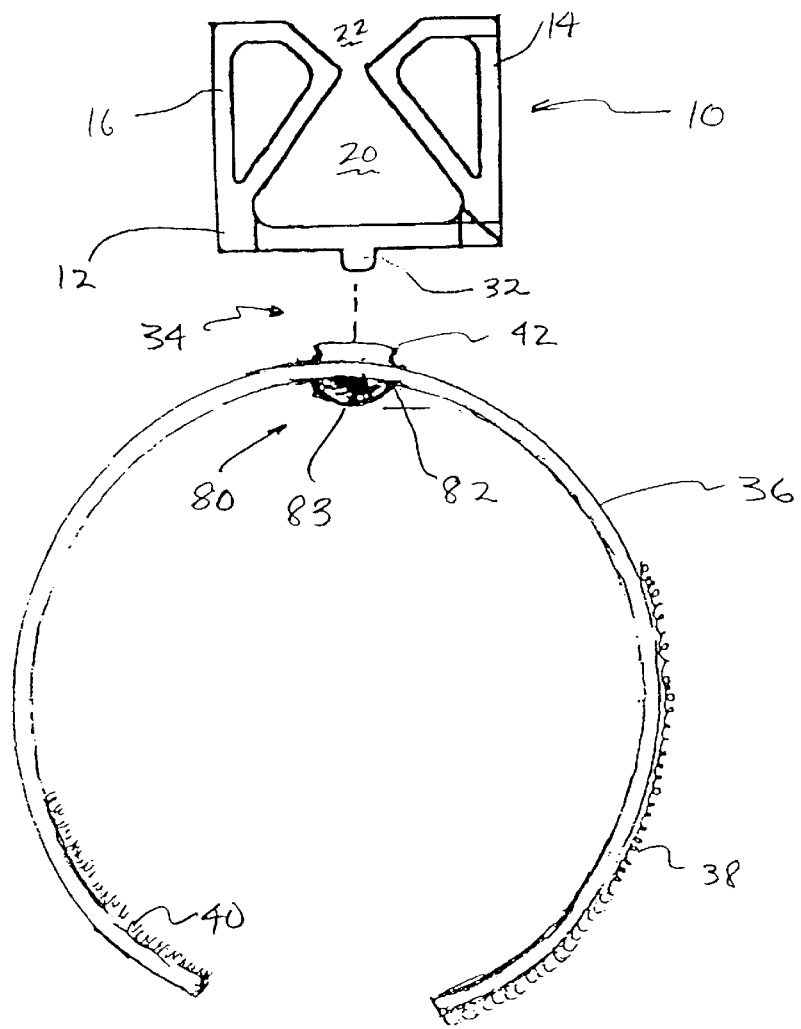
FIG. 7 depicts a second embodiment of the fishing pole holder of the present invention, particularly the first strap thereof, including an acupressure stimulator.
Figure 8:
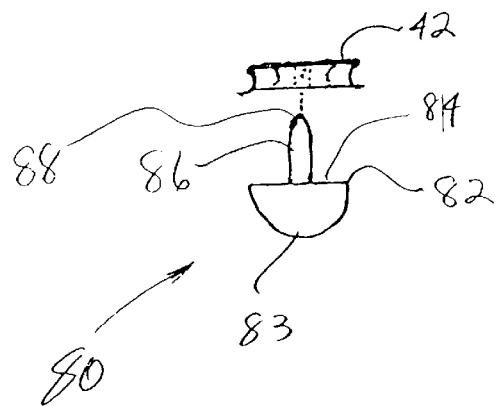
FIG. 8 depicts additional details of the acupressure stimulator, particularly how it may be connected to one of the straps of the present invention.

Referring to FIGS. 7 and 8, the straps 36, 58 of the present invention (the first strap 36 is depicted) may be modified to include an acupressure stimulator, indicated generally at 80 in FIG. 7. FIG. 8 shows that the stimulator 80 includes a smoothly rounded, hemispherical protruding button 82 with a flat side 84 and a post 86 extending perpendicularly from the flat side. The button 82 may be solid or hollow (i.e., hollow meaning hemispherical with a center empty except for the post 86), but in either case presents a substantially hard, rigid exposed curved surface 83. The post 86 has a free end 88. Ideally, the button 82 and post 86 are formed from a deformable material. Material deformable by heating is preferred and examples include plastics, vinyls, appropriate synthetics or mixtures thereof, but metal or alloys could be used as well. As shown in FIGS. 7 and 8, the stimulator 80 is attached to the strap 36, with the button 82 on the inside of the strap 36, by positioning the post 86 through the strap 36, into a hole in the annular male member 42 of the snap arrangement 34. The free end 88 is then deformed, as by heating, shortening the post 86 and securing the stimulator 80 and the male member 42 to the strap 36 as a unit as shown in FIG. 7. In use, when the strap 36 is wrapped around the wrist of a user, with or without the upper clip 10 snapped thereon, the button 82 causes pressure on that region of the human wrist which, when point pressure is exerted thereon, may alleviate nausea.

The straps 36, 58 may be of any appropriate length and, although the preferred embodiment of the clips 10, 44 will accommodate a variety of pole sizes and diameters, the clips may be made in various specific sizes. The depicted snap arrangements 34, 56 are intended to be representative of like releasable connective devices and the male/female parts may be reversed, i.e., the female portion carried by the straps and the male portion provided on the clips. Although nylon is the preferred material for the upper, arm strap 36, neoprene (for its water resistant and elastic nature) for the lower, leg strap 58, "Velcro" for the strap connectors and plastic for the clips 10, 44, these elements may be formed from any suitable material. For example, any synthetic or natural material generally resistant to the effect of water could be used for the straps and a buckle, snap or other projection/socket arrangement could be used to connect the strap ends to form the loops. While the pole receiving space 20 and notch 22 of the first, upper clip 10 is formed by planar, angular surfaces, the free ends of the shoulders 14, 16 may be rounded, and the inside, facing surfaces 28, 30 of the shoulders 14, 16 may be provided with rounded or serrated rod capturing protuberances. The shoulders 14, 16 may be solid, hollow or formed by a plurality of thin, angular walls connected at their ends as shown in FIG. 7, which also shows that the protruding portion of the snap portion 32 (or 54, 55) may be formed integrally with the respective clip. The button 82 is shown as smoothly rounded, but it could be pointed (generally conical) or flattened ( generally cylindrical).

Although a description of a preferred embodiment has been presented, various changes including those mentioned above could be made without deviating from the spirit of the present invention. It is desired, therefore, that reference be made to the appended claims rather than to the foregoing description to indicate the scope of the invention.

What is claimed is:

1. A fishing pole holder comprising
a first clip for relaeaseably holding a fishing pole, said clip comprising a base and two shoulders attached to and outstanding from a side of the base, each shoulder attached to the base at a first shoulder end and having a free shoulder end spaced from the base, said base and shoulders defining a fishing pole receiving space, said base carrying attachment means for releaseably attaching the first clip to an object; and a second clip comprising a base with two generally opposite end edges and an arcuate portion connected to the end edges of the base, said base carrying attachment means for releaseably attaching the second clip to an object; and a flexible elongated strap member with two ends and a length extending between the ends, said strap member carrying connecting means adjacent each end for connecting the ends to form a loop and clip attachment means complimentary to the attachment means carried by the first and second clips for releaseably attaching the strap member and one of the clips.

2. The fishing pole holder according to claim 1, further comprising a second flexible elongated strap member with two ends and a length extending between the ends, said second strap member carrying connecting means adjacent each end for connecting the ends to form a loop and carrying clip attachment means complimentary to the attachment means carried by the first and second clips for releaseably attaching the second strap member and one of the clips.

3. The fishing pole holder according to claim 2, wherein the attachment means carried by the first clip and the clip attachment means carried by the second clip each comprise a receiving portion of a snap arrangement.

4. The fishing pole holder according to claim 3, wherein the connecting means comprises a complimentary hook and loop arrangement.

5. The fishing pole holder according to claim 4, wherein the second strap member is longer than the first strap member.

6. The fishing pole holder according to claim 1, further comprising therapeutic means associated with at least one of said strap members.

7. The fishing pole holder according to claim 6, wherein the therapeutic means comprises an acupressure stimulator.

* * * * *